UNITED STATES PATENT OFFICE.

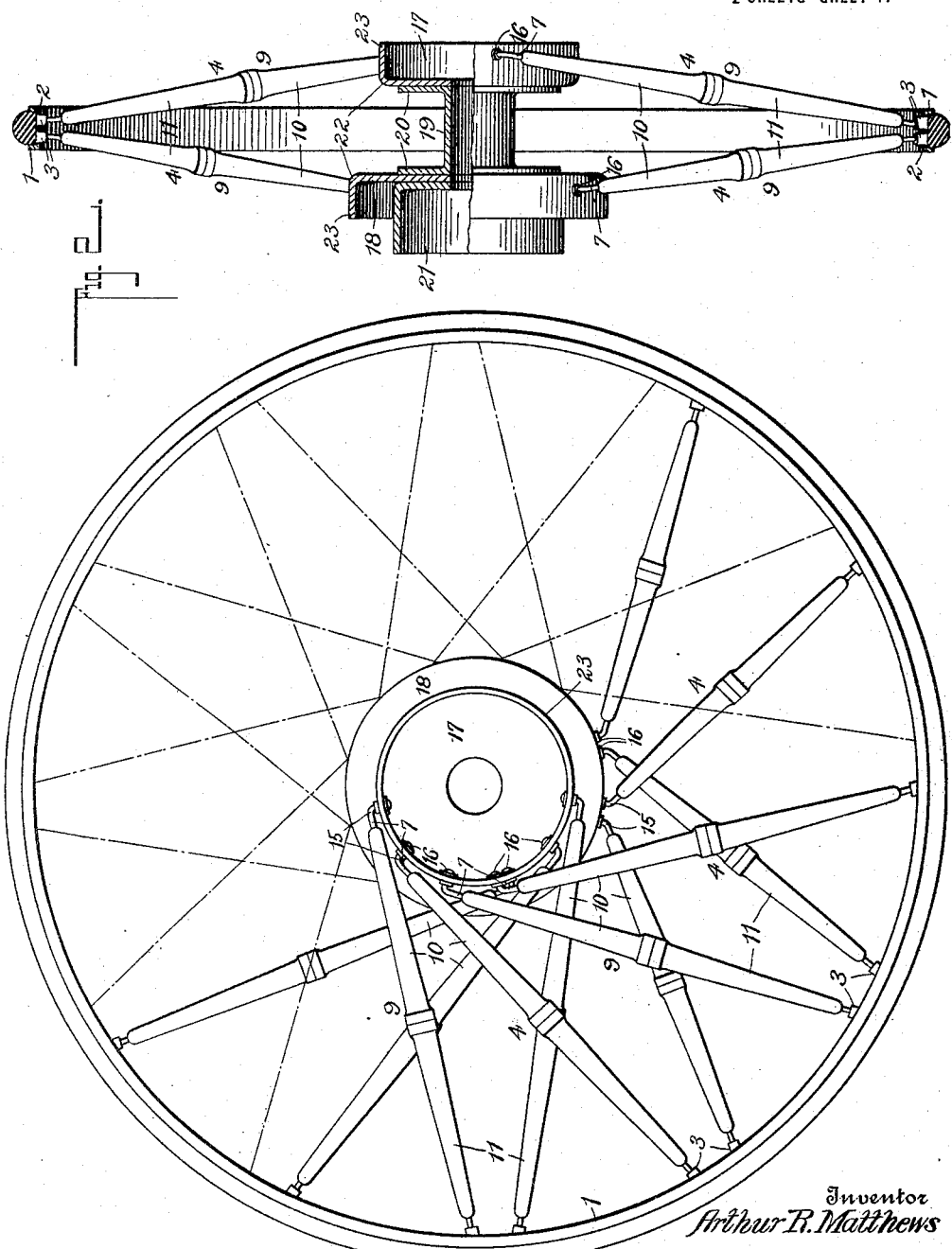

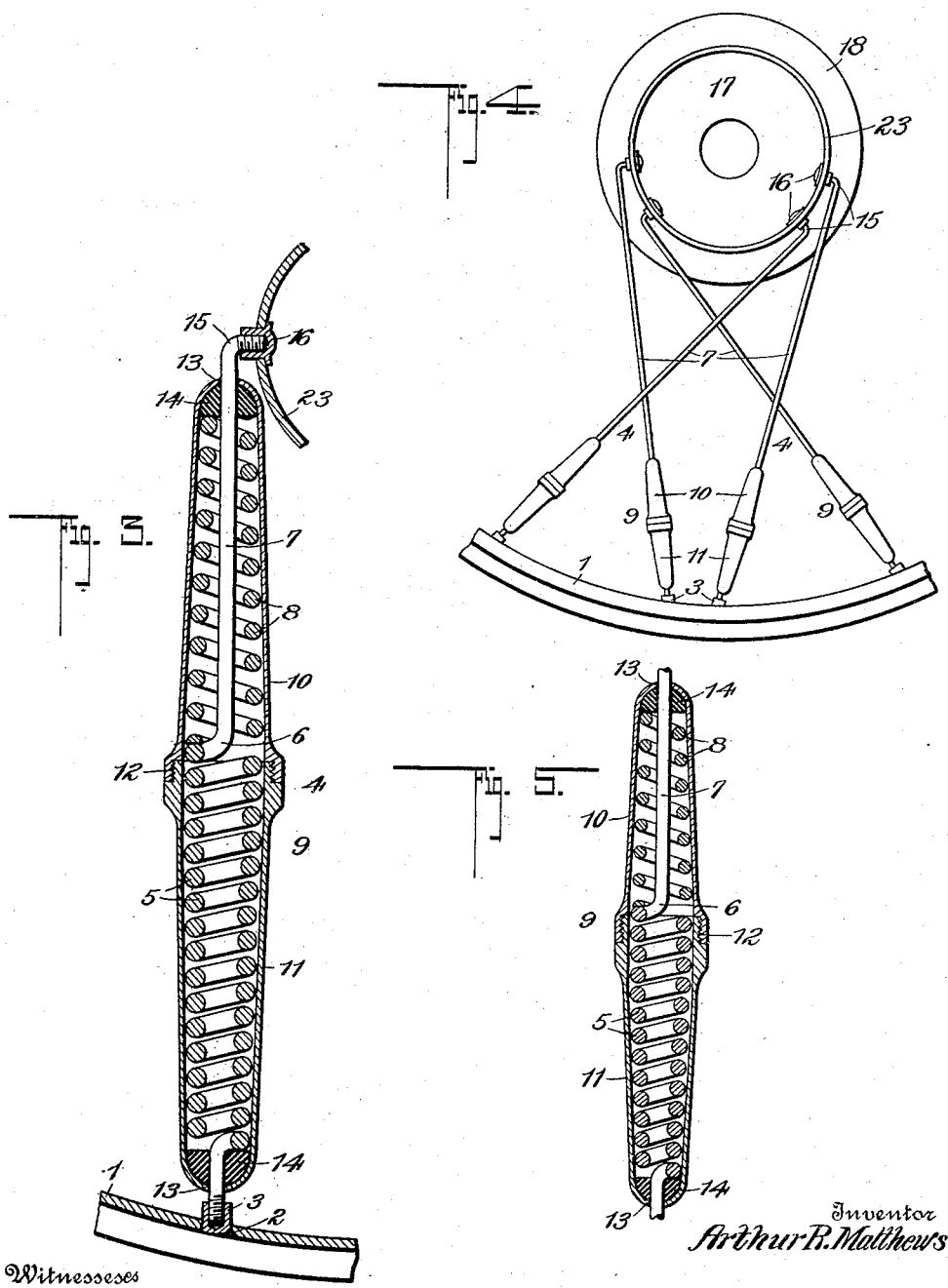

ARTHUR R. MATTHEWS, OF CHILDRESS, TEXAS, ASSIGNOR OF ONE-HALF TO CHARLES E. STEWARD, OF CHILDRESS, TEXAS.

SPRING-WHEEL.

1,203,227.  Specification of Letters Patent.  Patented Oct. 31, 1916.

Application filed November 13, 1915. Serial No. 61,341.

*To all whom it may concern:*

Be it known that I, ARTHUR R. MATTHEWS, a citizen of the United States, residing at Childress, in the county of Childress and State of Texas, have invented new and useful Improvements in Spring-Wheels, of which the following is a specification.

My invention relates to spring wheels, and has particular application to a spring spoke.

The principal object of my invention is to provide a wheel having spokes so constructed as to eliminate vibrations and jars of the vehicle to which it is attached, and furthermore to cause the respective spokes to return to their normal position after rebounding.

Another object of my invention is to provide a spoke which is highly resilient, which is efficient and durable in its construction and which may be manufactured at a nominal cost.

With the above and other objects in view, the invention consists in the features of construction, and the combination and arrangement of parts hereinafter described and claimed, reference being had to the accompanying drawings, in which:

Figure 1 is a side elevation of a wheel showing my improved form of spoke attached thereto; Fig. 2 is a vertical section of the same; Fig. 3 is a detail view of the spoke showing the manner in which it is mounted upon the wheel; Fig. 4 is a side elevation of a modified form; and Fig. 5 is a detail view of one of the spokes of my modified form.

Referring to the drawings in detail, 1 designates the felly which is of any well known construction and which is provided with the usual openings 2 to receive a nut 3. The nut 3 is interiorly threaded to receive the outer extremity of my improved form of spoke 4.

My improved form of spring spoke consists of a single piece of wire which is coiled intermediate its ends to form a helical retractile spring 5, the convolutions of the spring being larger at the medial portion than at the opposite extremities, thereby presenting a substantially barrel shaped spring. It will be noted that the convolutions of the spring are normally spaced apart so as to allow for the contraction of the spoke when pressure is applied to the felly. The inner extremity of the spoke is bent at right angles adjacent the coiled spring, as at 6, to form a shank 7 and disposing the latter substantially centrally of the coiled spring. Mounted upon the shank 7 is a coiled contractile spring 8, the convolution of the spring being larger at its outer end and tapering toward the opposite end. To confine the spring 8 upon the spoke and protect the helical spring 5 I have provided the spoke with a sectional casing 9 which has the opposite extremities thereof tapered from the medial portion and which is substantially cigar shaped. This casing comprises two sections 10 and 11 which have the confronting edges thereof threadedly interfitting each other, as at 12. This casing 9 has each of the sections provided with openings 13 at the opposite extremities which receive the respective ends of the spoke 4. Mounted within the opposite extremities of the sections 10 and 11 are bearings 14 which are preferably made of hard rubber and which receive the opposite extremities of the spoke and form abutments for the springs 5 and 8 to prevent the latter from contacting with the adjacent ends of the sections of the casing. The inner end of the shank 7 is bent at right angles, as at 15, the bent portion being threaded to engage a nut 16 mounted in one of the flanges 23. Disks 17 and 18 are secured to the opposite sides of the hub 19, the hub being of any well known construction, but for the sake of illustration I have shown the hub provided with peripheral flanges 20 to which the disks 17 and 18 are secured.

To permit the usual brake drum 21 to be attached to the hub and at the same time accommodate the disks 17 and 18, I have found it necessary to make one of the disks of greater diameter than the other, the disk lying adjacent the brake drum being of greater diameter. Each of the disks 17 and 18 has the marginal edges thereof bent at right angles, as at 22, to provide annular flanges 23. As previously stated, the inner ends of the spokes are secured to the annular flanges by means of the nuts 16 and, as will be noted, the spokes are arranged at a tangent to the hub, thereby permitting the use of long helical springs and at the same time increasing the resiliency of the wheel. Because of the fact that one of the disks 17 and 18 is smaller in diameter than the other, it is necessary to make the spokes connecting the smaller disk with the felly longer than the inner set of spokes, but in both instances I have used spokes which are constructed the same, the only difference being in the proportions.

In practice, when the wheel is vibrated by uneven roads or similar causes, the felly of the wheel is moved upwardly, causing the spokes on the lower side of the hub to contract while the spokes on the upper side of the hub expand, thereby absorbing the vibrations of the wheel and preventing the axle from imparting a similar movement to the vehicle. It will be noted that the coiled spring 8 which is mounted within the casing 9 and contacts with the helical spring 5 exerts its tension to retain the casing in close contact with one end of the spring 5 whereby any vibration or rattling of the casing will be eliminated.

In the modified form of my invention I have shown the spoke similarly constructed, the springs 5 and 8 being relatively smaller and also the casing, while the inner end of the spoke is relatively long so as to dispose the coiled portion adjacent the felly of the wheel. The operation of the spokes is the same as in my preferred form and therefore an extended explanation is thought unnecessary.

It is thought from the foregoing description, taken in connection with the accompanying drawings, that the construction and operation of my device will be apparent to those skilled in the art to which my invention relates without further description, and that minor changes in the size, shape, proportion and minor details of construction may be made without departing from the spirit and scope of the claim appended hereto.

Having thus described my invention, I claim:

A spoke for wheels comprising a single piece of resilient wire coiled intermediate its ends to form a tapering helical spring and a relatively long shank and a relatively short shank, said shanks extending axially from the opposite ends of the spring, a second tapering helical spring mounted on the relatively long shank and having its inner end abutting the adjacent end of the first mentioned spring, a casing embracing said springs, said casing being formed of tapering sections threadedly engaging each other at their confronting edges, said shanks extending through the opposite ends of the casing, and bearing blocks mounted on each of said shanks and interposed between the end of the casing and the adjacent end of each of the springs.

In testimony whereof I affix my signature in presence of two witnesses.

ARTHUR R. MATTHEWS.

Witnesses:
 FRANK W. FREEMAN,
 JOHN W. DAVIDSON.

Copies of this patent may be obtained for five cents each, by addressing the "Commissioner of Patents, Washington, D. C."